United States Patent
Katayama et al.

(10) Patent No.: US 7,701,608 B2
(45) Date of Patent: Apr. 20, 2010

(54) AUTOMATIC COUNTING APPARATUS, METHOD, AND RECORDING MEDIUM ON WHICH THE PROGRAM IS RECORDED

(75) Inventors: Takeshi Katayama, Kanagawa-ken (JP); Akira Yoda, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 848 days.

(21) Appl. No.: 11/542,258

(22) Filed: Oct. 4, 2006

(65) Prior Publication Data
US 2007/0076956 A1 Apr. 5, 2007

(30) Foreign Application Priority Data
Oct. 4, 2005 (JP) .............................. 2005-291419

(51) Int. Cl.
G06K 15/00 (2006.01)
G06K 9/00 (2006.01)
(52) U.S. Cl. ..................... 358/1.17; 358/1.18; 358/538; 382/118
(58) Field of Classification Search ................ 358/1.16, 358/1.17, 1.18, 1.9, 3.24, 3.26; 382/115, 382/118, 155, 156; 706/2, 15, 19, 25; 704/231, 704/232
See application file for complete search history.

(56) References Cited

U.S. PATENT DOCUMENTS
7,319,779 B1 * 1/2008 Mummareddy et al. ..... 382/118

2002/0102024 A1 * 8/2002 Jones et al. .................. 382/225
2003/0164878 A1 * 9/2003 Iizaka ........................ 348/169

FOREIGN PATENT DOCUMENTS
JP 2004-348618 A 12/2004

OTHER PUBLICATIONS

"Incorporating Prior Information in Machine Learning by Creating Virtual Examples", by Niyogi, P.; Girosi, F.; and Poggio, T., Proceedings of the IEEE, vol. 86, issue 11, Nov. 1998, pp. 2196-2209.*

* cited by examiner

Primary Examiner—James A Thompson
(74) Attorney, Agent, or Firm—Birch, Stewart, Kolasch & Birch, LLP

(57) ABSTRACT

An automatic counting device for measuring the number of target objects included in an image, which includes a discrimination section, a counting section, and a correction section. The discrimination section discriminates the target objects included in the image based on face information extracted from the image. The counting section measures the number of target objects discriminated by the discrimination means. The correction section corrects the number of each type of target object measured by the counting section such that the counting error arising from the difference in the discrimination accuracy between each type of target object is minimized based on information related to the discrimination accuracy for each type of target object.

9 Claims, 3 Drawing Sheets

US 7,701,608 B2

AUTOMATIC COUNTING APPARATUS, METHOD, AND RECORDING MEDIUM ON WHICH THE PROGRAM IS RECORDED

BACKGROUND OF THE INVENTION

1. Field of the Invention

The present invention relates to an automatic counting apparatus and method for automatically measuring the number of target objects included in an image. The present invention also relates to a recording medium on which a program for causing a computer to perform the method is recorded.

2. Description of the Related Art

A technique for discriminating individuals or attributes associated with the individuals, such as the gender, age, and the like from the face information included in an image to analyze the trend of the individuals or each of the attributes is known. U.S. Patent Application Publication No. 20030164878 and Japanese Unexamined Patent Publication No. 2004-348618, for example, disclose a method and system for analyzing the trend of the customers visiting sales floors of a store, in which the customers visiting the store are imaged by a camera installed in each corner of the store, and the face characteristic amounts of each customer is extracted from each recorded image to trace the customer, or to discriminate the gender or age of the customer.

Although, the technique for discriminating an individual or the gender based on the face information is advancing year after year, the technique is not yet fully matured to be able to discriminate 100% of any object. Generally speaking, there are two reasons why 100% discrimination rate is not achieved. First, there is a case that the face information is insufficient for discrimination. For example, only little information is extracted from the face of a person having long hair, in particular, from the side face of such person. Consequently, the discrimination rate for such persons is lower than that of the persons having short hair. Generally, it is said that the discrimination rate for females is lower than that of males since persons having long hair are found more often in females than males. The other reason is that there is a case that the characteristic of an individual is changed. For example, the facial characteristics of a female may be changed by the makeup so that the discrimination rate for females is lower than that of males. Further, the discrimination rate for the individuals wearing glasses is lower than that of the individuals without glasses, since the facial characteristic may be changed by changing the glasses. Still further, the discrimination rate for children is lower than that of adults since the facial expression may be changed as the children grow up.

In such cases described above, the discrimination rate (discrimination success rate) differs by 20% to 30% even if the same discrimination process is performed depending on the type of the object to be discriminated. In a statistical research, classified surveys according to the age and gender are often conducted as described in the aforementioned patent publications. The difference in the discrimination rate depending on the type of object to be surveyed gives a significant impact on the accuracy of surveys. In view of the problem described above, it is an object of the present invention to provide a scheme for minimizing the statistical error arising from the difference in the discrimination rate.

SUMMARY OF THE INVENTION

The present invention provides an automatic counting apparatus for automatically measuring the number of target objects included in an image, comprising:

a discrimination means for discriminating the target objects included in the image based on face information extracted from the image;

a counting means for measuring the number of target objects discriminated by the discrimination means; and a correction means for correcting the number of each type of target object measured by the counting means such that the counting error arising from the difference in the discrimination accuracy between each type of target object is minimized based on information related to the discrimination accuracy for each type of target object.

More specifically, the information related to the discrimination accuracy may be information that indicates the discrimination rate for each type of target object, and the correction means may be a means for performing correction in which the number of each type of target object measured by the counting means is replaced by a value which is obtained by dividing the number of each type of target object measured by the counting means by the discrimination rate for the corresponding target object.

Alternatively, the information related to the discrimination accuracy may be information that indicates the ratio of each type of target object included in the objects unsuccessfully discriminated by the discrimination means during a predetermined time period, and the correction means performs correction in which the number of each type of target object measured by the counting means is replaced by a value which is obtained by adding the number of objects unsuccessfully discriminated by the discrimination means multiplied by the ratio of unsuccessful discrimination for each type of target object to the number of each type of target object measured by the counting means.

Still further, the information related to the discrimination accuracy may be information that indicates the ratio of each type of target object included in the objects successfully discriminated by the discrimination means, and the correction means performs correction in which the number of each type of target object measured by the counting means is replaced by a value which is obtained by adding the number of objects unsuccessfully discriminated by the discrimination means multiplied by the ratio of successful discrimination for each type of target object to the number of each type of target object measured by the counting means.

The present invention also provides a recording medium on which an automatic counting program for automatically measuring the number of target objects included in an image is recorded, the program causing a computer to perform the steps of:

a discrimination process for discriminating the target objects included in the image based on face information extracted from the image;

a counting process for measuring the number of target objects discriminated by the discrimination means; and a correction process for correcting the number of each type of target object measured by the counting process such that the counting error arising from the difference in the discrimination accuracy between each type of target object is minimized based on information related to the discrimination accuracy for each type of target object.

The present invention further provides an automatic counting method for automatically measuring the number of target objects included in an image, comprising the steps of:

a discrimination process for discriminating the target objects included in the image based on face information extracted from the image;

a counting process for measuring the number of target objects discriminated by the discrimination means; and a correction process for correcting the number of each type of target object measured by the counting process such that the counting error arising from the difference in the discrimination accuracy between each type of target object is minimized based on information related to the discrimination accuracy for each type of target object.

According to the present invention, the counting results obtained through face discrimination are corrected based on the discrimination accuracy. Therefore, even in the case where the discrimination accuracy differs depending on the type of target object, the counting error arising from the difference in the discrimination accuracy between each type of target object may be minimized, and more accurate counting results may be obtained.

DESCRIPTION OF THE PREFERRED EMBODIMENTS

First Embodiment

Figure 1:
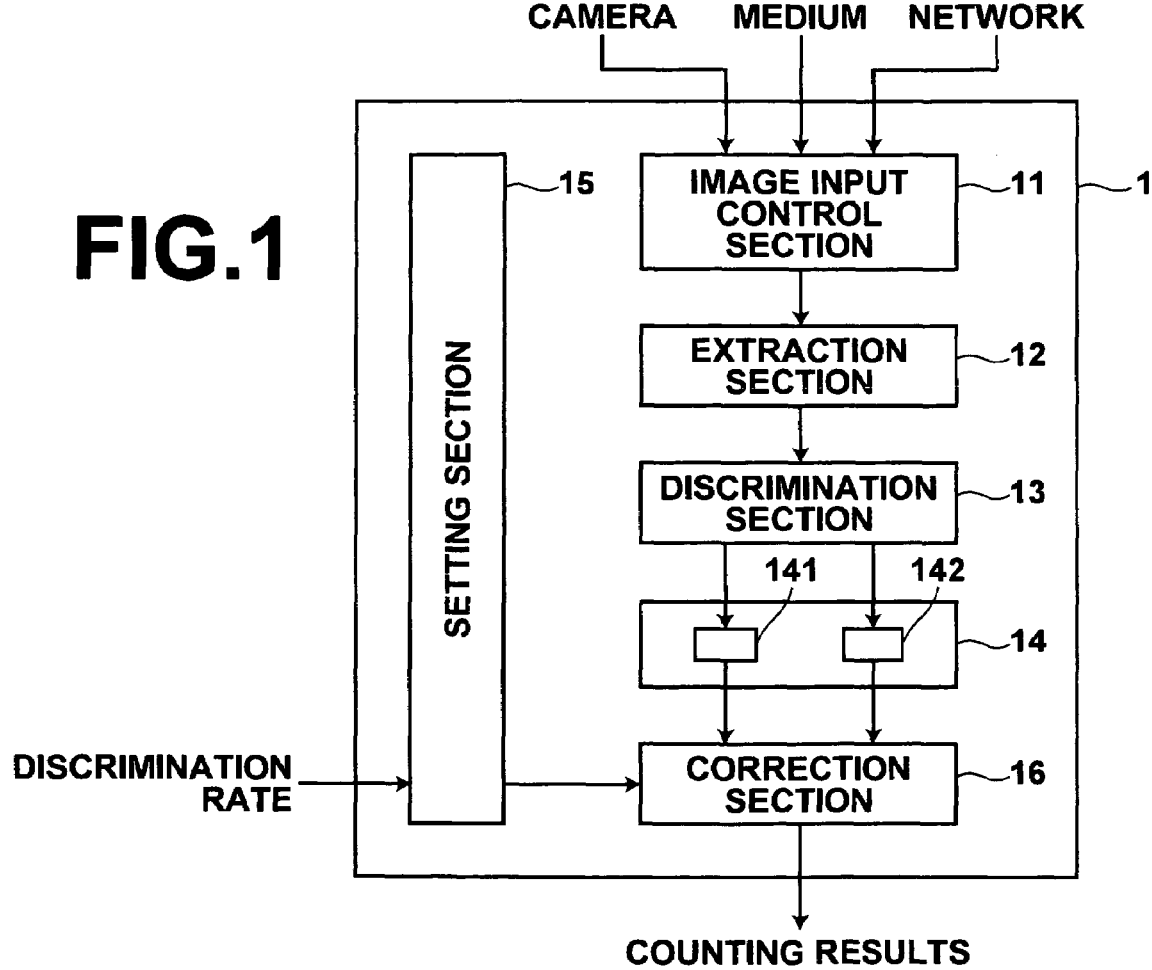
FIG. 1 is a schematic block diagram of the automatic counting apparatus according to a first embodiment of the present invention, illustrating the schematic construction thereof.

FIG. 1 is a schematic block diagram of the automatic counting apparatus 1 according to a first embodiment of the present invention, illustrating the schematic construction thereof. As shown in the drawing, the automatic counting apparatus 1 of the present embodiment includes: an image input control section 11; an extraction section 12; a discrimination section 13, a counting section 14; a setting section 15; and a correction section 16. More specifically, the automatic counting apparatus 1 of the present embodiment is an apparatus implemented in a general purpose computer having installed thereon a program element for realizing the function of each section described above. In the present embodiment, the computer includes a plurality of processors, and the each program element is executed in parallel by the plurality of processors.

The image input control section 11 provides an interface for directly connecting the automatic counting apparatus 1 to a camera for recording an image, an interface for connecting the automatic counting apparatus 1 to a media readout device, such as a DVD drive, or the like, and an interface for connecting the automatic counting apparatus 1 to a local area network or the Internet. The automatic counting apparatus 1 may count the objects in real time as the image is being downloaded from the camera directly or through a network. It may also read in an image stored in a recording medium and count the objects included therein.

The extraction section 12 detects the face of a person from an image inputted through the image input control section 11. Any of known techniques may be used for detecting the face from the image, and here, as an example, a skin color area of a predetermined size is detected as the face. Then, the extraction section 12 extracts characteristics that indicate the features of the face from each of the detected faces. The types and number of characteristics to be extracted are predetermined according to the type of target object. Hereinafter, a description will be made with reference to an example case in which the number of males and females are counted. Here, the extraction section 12 extracts male characteristics and female characteristics from each of the detected faces, and stores a single set of data or a plurality of sets of data (characteristic amounts) that represent the extracted characteristics in a memory of the automatic counting apparatus 1 as face information together with predetermined management data.

The discrimination section 13 discriminates the attribute or state of each of the persons included in the image based on the characteristic amounts included in the face information stored in the memory. As described above, a description will be made here with reference to an example case in which the discrimination section 13 discriminates males and females respectively. In the present embodiment, the discrimination section 13 discriminates males from the persons whose faces are detected by checking the plurality of characteristic amounts included in the face information with a plurality of characteristic amounts representing male characteristics, converting each of the check results into a score and adding it up, and comparing the added-up score with a predetermined threshold value. Likewise, it also checks the plurality of characteristic amounts included in the face information with a plurality of characteristic amounts representing female characteristics to discriminate females. When discriminating the gender, it may be possible to discriminate only males, and to unconditionally determine the objects as females not discriminated as males. But, in the present embodiment, the discrimination section 13 performs the discrimination process for both males and females. Then, the discrimination section 13 outputs a male code when a male is detected and a female code when a female is detected. Further, the discrimination section 13 outputs a code indicating a discrimination failure in the case that a person is unable to be discriminated whether a male or a female although the face of the person is detected (not shown).

The counting section 14 includes a counter 141 for counting males and a counter 142 for counting females, and counts up the counters 141 and 142 when the male code and female code are outputted from the discrimination section 13 respectively. In the present embodiment, the counting section 14 remains idle when the discrimination failure code is outputted from the discrimination section 13. In the present embodiment, the target objects are male and female, so that the number of counters controlled by the counting section 14 is two, but the number of counters may be increased or decreased depending on the number of the types of target objects. In the present embodiment, the counter is an 8-bit area allocated on the memory, and the number of counters may be changed by changing the size of allocated memory area.

Setting section 15 holds information that indicates the discrimination accuracy of the discrimination section 13 for each type of object to be discriminated. In the present embodiment, the setting section 15 holds a discrimination rate as the information that indicates the discrimination accuracy. The discrimination rate is indicated by a value which is in the range of 0 to 1, and a greater value indicates a more accurate discrimination.

The discrimination rate is largely dependent on the performance of the apparatus or the discrimination algorithm employed in the apparatus. Therefore, in the initial state at the shipment of the apparatus, the setting section 15 holds a discrimination rate registered by the manufacturer of the apparatus. In the mean time, the discrimination rate also depends on the measuring environment. For the measurement in a place where only long-haired persons gather, for example, the discrimination rate is degraded compared with the measurement in other places. Consequently, a configuration is adopted in which the setting section 15 displays a predetermined registration screen on a monitor (not shown) attached to the automatic counting apparatus 1 at the request of the operator to accept the input of the discrimination rate for each target object on the screen. The operator may change the currently registered discrimination rate through this function based on its own experience.

The correction section 16 reads out the values of the counters 141 and 142, corrects the readout values based on the male discrimination rate and female discrimination rate held in the setting section 15, and outputs the corrected values as the counting results of the automatic counting apparatus 1. In the present embodiment, the correction section 16 performs correction based on the following formulae.

Number of Males=Value of Counter 141/Male Discrimination Rate

Number of Females=Value of Counter 142/Female Discrimination Rate

Consequently, for example, if values of 0.98 and 0.82 are held as the male and female discrimination rates respectively, and values of the counters 141 and 142 are 49 and 41 respectively, then the automatic counting apparatus 1 outputs a value of 50 for male, and a value of 50 for female as the counting results.

The correction section 16 may output only the final counting results by performing the aforementioned calculations after the counting by the counting section 14 is completed, or may output the counting results in the middle of the counting. For example, when the number of males and females are measured per unit time (e.g., 5 minutes), the correction section 16 reads in the counter values of the counting section 14 every 5 minutes, and outputs the values obtained by performing the corrections after resetting the counters to zero. If the temporal changes in the number of males and females are measured, the correction section reads in the counter values of the counting section 14 every 5 minutes, and outputs the values obtained by performing the correction without resetting the counters.

As described above, even in the case where the discrimination rate for each type of target object differs with each other depending on the performance of the apparatus, discrimination algorithm employed, or measuring environment, the automatic counting apparatus 1 of the present embodiment may perform correction to the actually obtained counting results based on the discrimination rate, so that substantially correct counting results may be obtained.

Second Embodiment

Figure 2:
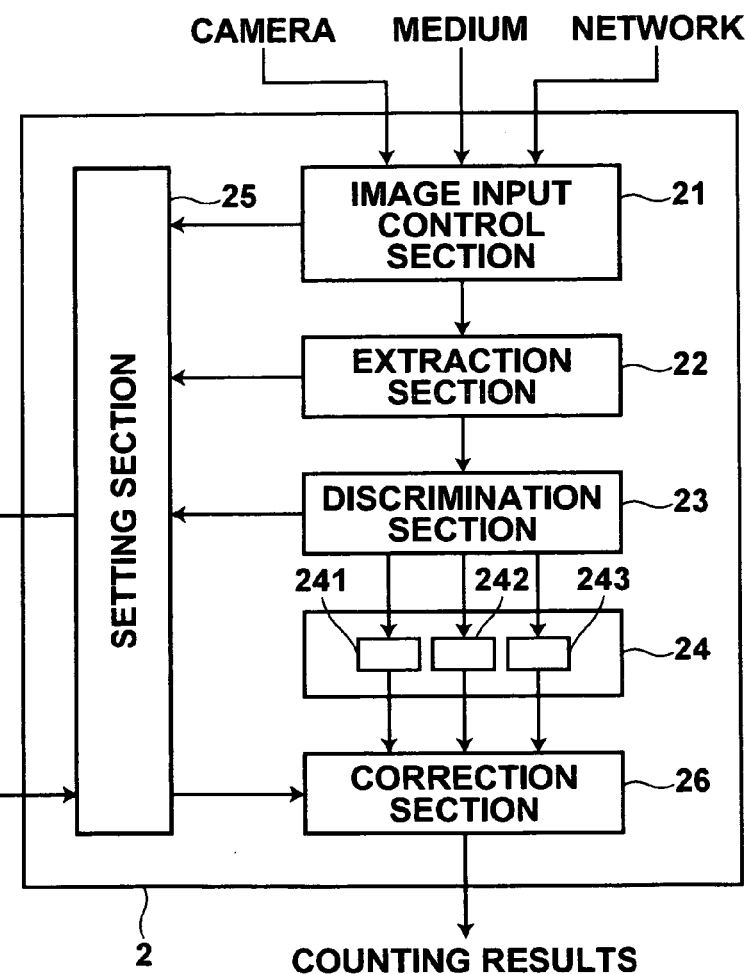
FIG. 2 is a schematic block diagram of the automatic counting apparatus according to a second embodiment of the present invention, illustrating the schematic construction thereof.

FIG. 2 is a schematic block diagram of the automatic counting apparatus 2 according to a second embodiment of the present invention, illustrating the schematic construction thereof. As shown in the drawing, the automatic counting apparatus 2 of the present embodiment includes: an image input control section 21; an extraction section 22; a discrimination section 23, a counting section 24; a setting section 25; and a correction section 26.

The function of the image input control section 21 is similar to the image input control section 11 of the apparatus according to the first embodiment, but differs in that it supplies the image under processing to the setting section 25. The function of the extracting section 22 is also similar to the extracting section 12 of the apparatus according to the first embodiment, but differs in that it supplies information representing the contour of an extracted face. The function of the discrimination section 23 is also similar to the discrimination section 13 of the apparatus according to the first embodiment, but differs in that it supplies each code representing each discrimination result to the setting section 25 as well as to the counting section 24.

The counting section 24 includes a counter 241 for counting males, a counter 242 for counting females, and a counter 243 for counting the number of discrimination failures. It counts up the counters 241, 242, and 243 when the male code, female code, and discrimination failure code are outputted from the discrimination section 23 respectively. The number of counters may be increased or decreased depending on the number of the types of target objects, as in the first embodiment.

The setting section 25 collects information from the image input control section 21, extraction section 22, and discrimination section 23 for a predetermined time period from the time when the measurement of the automatic counting apparatus 2 is initiated, and cumulatively stores the information if a predetermined request is made from the operator. Then, if a setting screen is invoked by the operator, the setting section 25 outputs images supplied from the image input control section 21 in temporal sequence to a monitor screen (not shown). In this case, lines indicating the contours of the extracted faces are superimposed on the images using the information supplied by the extraction section 22. Further, a mark indicating the discrimination result is displayed adjacent to each face based on the information supplied from the discrimination section 23. A particularly noticeable mark is displayed adjacent to an unsuccessfully discriminated face to have the operator check the unsuccessfully discriminated face.

The operator determines whether the person unsuccessfully discriminated by the automatic counting apparatus 2 is a male or a female by visually checking the image to obtain a male-female ratio of the unsuccessfully discriminated persons, and inputs the value of the male-female ratio to the automatic counting apparatus 2 through an input device (not shown) connected thereto. As the value of the male-female ratio, for example, the number of males and females may be directly inputted, and the setting section 25 accepts the inputs from the operator and replaces them with the values that indicate the male and female ratios respectively. This results in the respective ratios of males and females included in the unsuccessfully discriminated faces (male-female ratio of unsuccessfully discriminated faces) obtained based on the actually observed processing status, though for a limited time period, to be stored in the setting section 26 of the automatic counting apparatus 2.

The correction section 26 may read out the values of the counters 241, 242, and 243 of the counting section 25 at any timing after the setting operation by the operator is completed, though it is unable to initiate the operation until the information gathering by the setting section 25 and the setting operation by the operator have been completed. The correction section 26 may output only the final counting results by performing calculations after the counting by the counting section 24 is completed, or may output counting results in the middle of the counting. In the present embodiment, the calculations performed by the correction section 26 may be expressed by the formulae shown below.

Number of Males=Value of Counter 241+Value of Counter 243×Male Ratio

Number of Females=Value of Counter 242+Value of Counter 243×Female Ratio

Consequently, for example, if a male ratio of 0.25 and female ratio of 0.75 are supplied from the setting section 25, and the values of counters 241, 242, and 243 are 41, 39, and 20 respectively, then the automatic counting apparatus 2 outputs a value of 36 for male, and a value of 54 for female as the counting results.

According to the automatic counting apparatus 2 of the present embodiment, the operator is allowed to check the discrimination accuracy of the automatic counting apparatus 2 with its own eyes for a predetermined time period, and to input setting information required for the correction based on the knowledge obtained by the visual checking. Consequently, the automatic counting apparatus 2 may correct the counter values based on the inputted information. This means that the automatic counting apparatus 2 may perform correction adapted to the measuring environment, so that substantially correct counting results may be obtained. Further, the values set by the operator may be directly applied to the case in which the same objects are counted under the same environment, so that the burden on the operator is not so great.

Third Embodiment

Figure 3:
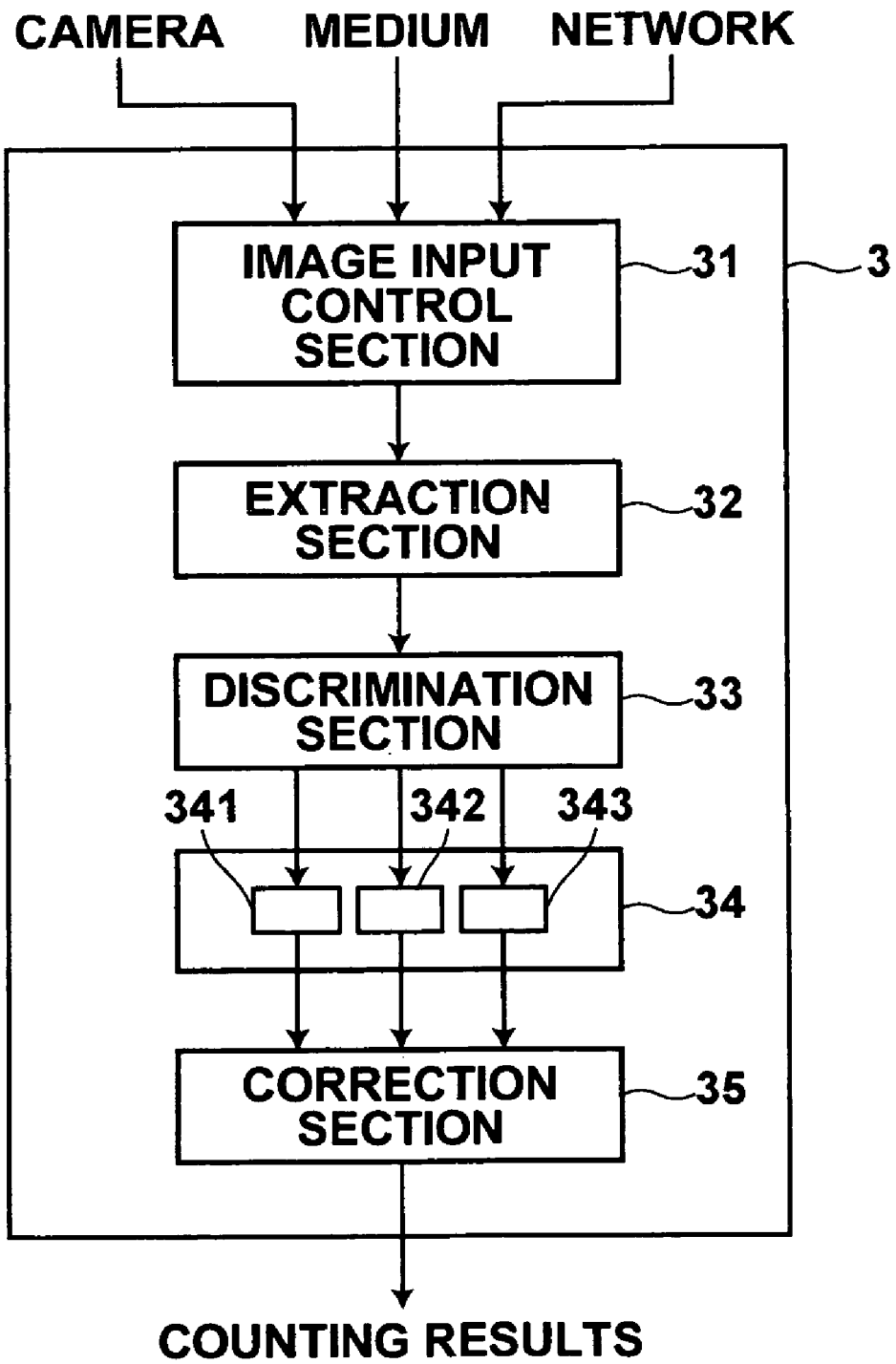
FIG. 3 is a schematic block diagram of the automatic counting apparatus according to a third embodiment of the present invention, illustrating the schematic construction thereof.

FIG. 3 is a schematic block diagram of the automatic counting apparatus 3 according to a third embodiment of the present invention, illustrating the schematic construction thereof. As shown in the drawing, the automatic counting apparatus 3 of the present embodiment includes: an image input control section 31; an extraction section 32; a discrimination section 33, a counting section 34; and a correction section 35.

The function of the image input control section 31, extraction section 32, and discrimination section 33 are respectively identical to the function of the image input control section 11, extraction section 12, and discrimination section 13 of the apparatus according to the first embodiment. Therefore, they will not be elaborated upon further here. Further, the function of the counting section 34 is identical to the function of the counting section 24 of the apparatus according to the second embodiment, so that it will not be elaborated upon further here.

The automatic counting apparatus 3 of the present embodiment does not include a setting section like that provided in other embodiments. Instead of pre-storing values to be used in the correction, the automatic counting apparatus 3 sorts out unsuccessfully discriminated objects into any type of the target objects using the counting results of successfully discriminated objects.

The correction section 35 reads out the values of the counters 341, 342, and 343 of the counting section 34, and divides the value of the counter 343 into male and female based on the ratio between the values of the counters 341 and 342. In the present embodiment, the correction section 35 corrects the counter values based on the formulae shown below.

Number of Males=Value of Counter 341+Value of Counter 343×Value of Counter 341/(Value of Counter 341+Value of Counter 342)

Number of Females=Value of Counter 342+Value of Counter 343×Value of Counter 342/(Value of Counter 341+Value of Counter 342)

Consequently, for example, the values of the counters 341, 342, and 343 are 60, 20, and 20 respectively, the automatic counting apparatus 3 outputs a value of 75 for male and a value of 25 for female as the counting results.

The automatic counting apparatus 3 may fail to discriminate the target object, but it performs correction using the counting results of successfully discriminated target objects, so that that the counting results reflecting the actual situation maybe obtained. Further, no setting operation is required so that the burden on the operator is comparatively small.

What is claimed is:

1. An automatic counting apparatus for automatically measuring the number of target objects included in an image, comprising:

a discrimination means for discriminating the target objects included in the image based on face information extracted from the image;

a counting means for measuring the number of target objects discriminated by the discrimination means; and a correction means for correcting the number of each type of target object measured by the counting means such that the counting error arising from the difference in the discrimination accuracy between each type of target object is minimized based on information related to the discrimination accuracy for each type of target object, wherein the information related to the discrimination accuracy is information that indicates a discrimination rate for each type of target object; and the correction means performs correction in which the number of each type of target object measured by the counting means is replaced by a value which is obtained by dividing the number of each type of target object measured by the counting means by the discrimination rate for the corresponding target object.

2. An automatic counting apparatus for automatically measuring the number of target objects included in an image, comprising:

a discrimination means for discriminating the target objects included in the image based on face information extracted from the image;

a counting means for measuring the number of target objects discriminated by the discrimination means; and a correction means for correcting the number of each type of target object measured by the counting means such that the counting error arising from the difference in the discrimination accuracy between each type of target object is minimized based on information related to the discrimination accuracy for each type of target object, wherein the information related to the discrimination accuracy is information that indicates a ratio of each type of target object included in the objects unsuccessfully discriminated by the discrimination means during a predetermined time period; and the correction means performs correction in which the number of each type of target object measured by the counting means is replaced by a value which is obtained by adding the number of objects unsuccessfully discriminated by the discrimination means multiplied by the ratio of unsuccessful discrimination for each type of target object to the number of each type of target object measured by the counting means.

3. An automatic counting apparatus for automatically measuring the number of target objects included in an image, comprising:

a discrimination means for discriminating the target objects included in the image based on face information extracted from the image;

a counting means for measuring the number of target objects discriminated by the discrimination means; and a correction means for correcting the number of each type of target object measured by the counting means such that the counting error arising from the difference in the discrimination accuracy between each type of target object is minimized based on information related to the discrimination accuracy for each type of target object, wherein the information related to the discrimination accuracy is information that indicates a ratio of each type of target object included in the objects successfully discriminated by the discrimination means; and the correction means performs correction in which the number of each type of target object measured by the counting means is replaced by a value which is obtained by adding the number of objects unsuccessfully discriminated by the discrimination means multiplied by the ratio of successful discrimination for each type of target object to the number of each type of target object measured by the counting means.

4. A computer readable recording medium encoded with instructions, wherein the instructions when executed by a computer cause the computer to perform a method for automatically measuring the number of target objects included in an image, the method comprising:

discriminating the target objects included in the image based on face information extracted from the image;

measuring the number of target objects discriminated by the discriminating; and correcting the number of each type of target object measured by the measuring such that a counting error arising from difference in discrimination accuracy between each type of target object is minimized based on information related to the discrimination accuracy for each type of target object, wherein the information related to the discrimination accuracy is information that indicates a discrimination rate for each type of target object; and the correcting performs correction in which the number of each type of target object measured by the measuring is replaced by a value which is obtained by dividing the number of each type of target object measured by the measuring by the discrimination rate for the corresponding target object.

5. A computer readable recording medium encoded with instructions, wherein the instructions when executed by a computer cause the computer to perform a method for automatically measuring the number of target objects included in an image, the method comprising:

discriminating the target objects included in the image based on face information extracted from the image;

measuring the number of target objects discriminated by the discriminating; and correcting the number of each type of target object measured by the measuring such that a counting error arising from difference in discrimination accuracy between each type of target object is minimized based on information related to the discrimination accuracy for each type of target object, wherein the information related to the discrimination accuracy is information that indicates a ratio of each type of target object included in the objects unsuccessfully discriminated by the discriminating during a predetermined time period; and the correcting performs correction in which the number of each type of target object measured by the measuring is replaced by a value which is obtained by adding the number of objects unsuccessfully discriminated by the discriminating multiplied by the ratio of unsuccessful discrimination for each type of target object to the number of each type of target object measured by the measuring.

6. A computer readable recording medium encoded with instructions, wherein the instructions when executed by a computer cause the computer to perform a method for automatically measuring the number of target objects included in an image, the method comprising:

discriminating the target objects included in the image based on face information extracted from the image;

measuring the number of target objects discriminated by the discriminating; and correcting the number of each type of target object measured by the measuring such that a counting error arising from difference in discrimination accuracy between each type of target object is minimized based on information related to the discrimination accuracy for each type of target object, wherein the information related to the discrimination accuracy is information that indicates a ratio of each type of target object included in the objects successfully discriminated by the discriminating; and the correcting performs correction in which the number of each type of target object measured by the measuring is replaced by a value which is obtained by adding the number of objects unsuccessfully discriminated by the discriminating multiplied by the ratio of successful discrimination for each type of target object to the number of each type of target object measured by the measuring.

7. An automatic counting method for automatically measuring the number of target objects included in an image, comprising:

discriminating the target objects included in the image based on face information extracted from the image;

measuring the number of target objects discriminated by the discriminating; and correcting the number of each type of target object measured by the measuring such that a counting error arising from difference in discrimination accuracy between each type of target object is minimized based on information related to the discrimination accuracy for each type of target object, wherein the information related to the discrimination accuracy is information that indicates a discrimination rate for each type of target object; and the correcting performs correction in which the number of each type of target object measured by the measuring is replaced by a value which is obtained by dividing the number of each type of target object measured by the measuring by the discrimination rate for the corresponding target object.

8. An automatic counting method for automatically measuring the number of target objects included in an image, comprising:

discriminating the target objects included in the image based on face information extracted from the image;

measuring the number of target objects discriminated by the discriminating; and correcting the number of each type of target object measured by the measuring such that a counting error arising from difference in discrimination accuracy between each type of target object is minimized based on information related to the discrimination accuracy for each type of target object, wherein the information related to the discrimination accuracy is information that indicates a ratio of each type of target object included in the objects unsuccessfully discriminated by the discriminating during a predetermined time period; and the correcting performs correction in which the number of each type of target object measured by the measuring is replaced by a value which is obtained by adding the number of objects unsuccessfully discriminated by the discriminating multiplied by the ratio of unsuccessful discrimination for each type of target object to the number of each type of target object measured by the measuring.

9. An automatic counting method for automatically measuring the number of target objects included in an image, comprising:

discriminating the target objects included in the image based on face information extracted from the image;

measuring the number of target objects discriminated by the discriminating; and correcting the number of each type of target object measured by the measuring such that a counting error arising from difference in discrimination accuracy between each type of target object is minimized based on information related to the discrimination accuracy for each type of target object, wherein the information related to the discrimination accuracy is information that indicates a ratio of each type of target object included in the objects successfully discriminated by the discriminating; and the correcting performs correction in which the number of each type of target object measured by the measuring is replaced by a value which is obtained by adding the number of objects unsuccessfully discriminated by the discriminating multiplied by the ratio of successful discrimination for each type of target object to the number of each type of target object measured by the measuring.

* * * * *